(12) United States Patent
Fracchia et al.

(10) Patent No.: US 10,166,972 B2
(45) Date of Patent: Jan. 1, 2019

(54) HYBRID ELECTRIC VEHICLE CONTROLLER AND METHOD

(71) Applicant: Jaguar Land Rover Limited, Coventry (GB)

(72) Inventors: Riccardo Fracchia, Coventry (GB); Steve Liggins, Coventry (GB); Matthew Hancock, Coventry (GB); Andy Mould, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 0 days.

(21) Appl. No.: 14/913,104

(22) PCT Filed: Aug. 20, 2014

(86) PCT No.: PCT/EP2014/067756
§ 371 (c)(1),
(2) Date: Feb. 19, 2016

(87) PCT Pub. No.: WO2015/024974
PCT Pub. Date: Feb. 26, 2015

(65) Prior Publication Data
US 2016/0200315 A1     Jul. 14, 2016

(30) Foreign Application Priority Data

Aug. 21, 2013 (GB) .................... 1314989.3

(51) Int. Cl.
*B60W 20/20* (2016.01)
*B60W 20/11* (2016.01)
(Continued)

(52) U.S. Cl.
CPC .......... *B60W 20/20* (2013.01); *B60K 6/448* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS 6,554,088 B2 * 4/2003 Severinsky ............ B60H 1/004
180/65.23
8,187,146 B2 * 5/2012 Allgaier .................. B60K 6/48
477/5
(Continued)

FOREIGN PATENT DOCUMENTS

DE  10 2010 039 375 A1   2/2012
EP      2 559 578 A1   2/2013
(Continued)

OTHER PUBLICATIONS

Caraceni et al., "Hybrid Power Unit Development for Fiat Multipla Vehicle" Feb. 23-26, 1998, SAE the Engineering Society for Advancing Mobility Land Sea Air and Space International (Year: 1998).*
(Continued)

*Primary Examiner* — Mussa A Shaawat
*Assistant Examiner* — Abdhesh K Jha
(74) *Attorney, Agent, or Firm* — Myers Bigel, P.A.

(57) ABSTRACT

A controller is provided for a parallel hybrid electric vehicle. The vehicle powertrain includes an engine, an electric propulsion motor powered by an energy storage device, and an electric generator driven by the engine to recharge the energy storage device. The controller receives one or more signals indicative of one or more operating modes in which the vehicle is to be operated; receives a signal indicative of demanded powertrain drive torque; and causes the engine and electric propulsion motor to deliver drive torque to one or more wheels to drive the vehicle. The controller causes the powertrain to operate in a parallel powertrain mode, where the amount of torque delivered by the electric propulsion motor is determined by the controller in dependence (Continued)

VSC Behaviour in SEV

| Mode | Customer Behaviour Changes (vs. std) | HEV System Behaviour Changes | |
|---|---|---|---|
| SEV | EV availability significantly increased | Nominal SOC setpoint increased to ~60%. | |
| | | Charging load with engine running greater than default mode. | |
| | | Engine forced on above ~35mph with accel pedal pressed. | |
| | | Engine less likely to latch on in corners. | Cornering inhibit thresholds SEV dependent. |
| | | Battery fully charged when in P/N after min SOC reached or when engine revved. | P/N charge mode and SOC target cal made SEV dependent. |
| | Reduced time with EV not available after min SOC reached. | Battery charges at all times in low SOC latch (35% - 41%). Stop start less accessible. | Stop start threshold dependent on SEV mode. |
| | | | Stationary charging enable flag SEV dependent. |
| | | | Vehicle speed threshold for shutdown in latch SEV dependent. |
| | | | Overrun charging switched on in SEV only. |
| | Maximum performance less accessible (preserving SOC for EV mode). | EM torque boost only available with high pedal input / kickdown | Max PT torque from VSC made pedal and mode dependent. |
| | Transient performance reduced (preserving SOC for EV mode) | Torque filling restricted in SEV. | Torque fill level made calibratable dependent on mode | on the signal indicative of demanded powertrain drive torque and the one or more signals indicative of the one or more operating modes.

13 Claims, 5 Drawing Sheets

(51) Int. Cl.
| | | |
|---|---|---|
| *B60W 20/19* | (2016.01) | |
| *B60W 10/02* | (2006.01) | |
| *B60W 10/06* | (2006.01) | |
| *B60W 10/08* | (2006.01) | |
| *B60W 10/22* | (2006.01) | |
| *B60W 10/26* | (2006.01) | |
| *B60W 10/18* | (2012.01) | |
| *B60K 6/448* | (2007.10) | |
| *B60W 50/08* | (2012.01) | |
| *B60W 10/10* | (2012.01) | |
| *B60W 30/188* | (2012.01) | |

(52) U.S. Cl.
CPC ............ *B60W 10/08* (2013.01); *B60W 10/10* (2013.01); *B60W 10/18* (2013.01); *B60W 10/22* (2013.01); *B60W 10/26* (2013.01); *B60W 20/11* (2016.01); *B60W 20/19* (2016.01); *B60W 50/082* (2013.01); *B60W 30/1882* (2013.01); *B60W 2510/244* (2013.01); *B60W 2540/10* (2013.01); *B60W 2540/103* (2013.01); *B60W 2710/0666* (2013.01); *B60W 2710/083* (2013.01); *B60W 2710/244* (2013.01); *Y02T 10/56* (2013.01); *Y02T 10/6243* (2013.01); *Y02T 10/6286* (2013.01); *Y02T 10/7258* (2013.01); *Y02T 10/84* (2013.01); *Y10S 903/93* (2013.01)

(56) References Cited

U.S. PATENT DOCUMENTS

| | | | | |
|---|---|---|---|---|
| 8,834,317 B2* | 9/2014 | Wang | ...................... | B60K 6/445 |
| | | | | 477/3 |
| 9,007,199 B2* | 4/2015 | Yamada | ................... | G07C 5/00 |
| | | | | 340/438 |
| 9,205,831 B2* | 12/2015 | Dextreit | ................. | B60K 6/448 |
| 9,315,187 B2* | 4/2016 | Stenson | ................. | B60K 6/445 |
| 2008/0120001 A1* | 5/2008 | Heap | ...................... | B60K 6/445 |
| | | | | 701/54 |
| 2008/0146407 A1 | 6/2008 | Tuckfield | | |
| 2008/0236912 A1 | 10/2008 | Ueoka et al. | | |
| 2011/0130901 A1 | 6/2011 | Mori et al. | | |
| 2011/0166733 A1* | 7/2011 | Yu | .......................... | B60K 6/445 |
| | | | | 701/22 |
| 2012/0028739 A1 | 2/2012 | Stevens | | |
| 2013/0158756 A1 | 6/2013 | Yamazaki et al. | | |

FOREIGN PATENT DOCUMENTS

| | | |
|---|---|---|
| GB | 2483371 A | 3/2012 |
| GB | 2486708 A | 6/2012 |
| JP | 2003-111205 A | 4/2003 |
| JP | 2005/124282 A | 5/2005 |
| JP | 2008/168700 A | 7/2008 |
| JP | 2011-051383 A | 3/2011 |
| JP | 2012/106672 A | 6/2012 |
| WO | WO 2012/028739 A1 | 3/2012 |
| WO | WO 2012/090545 A1 | 7/2012 |
| WO | WO 2012/105045 A1 | 8/2012 |
| WO | WO 2012/152613 A1 | 11/2012 |
| WO | WO 2013/110706 A1 | 8/2013 |

OTHER PUBLICATIONS

Combined Search and Examination Report, GB 1414797.9, dated Feb. 25, 2015, 7 pages.
Combined Search and Examination Report, GB 1314989.3, dated Mar. 3, 2014, 7 pages.
Notification of Transmittal of the International Search Report and the Written Opinion, PCT/EP2014/067756, dated Nov. 5, 2014, 15 pages.
Office Action Summary corresponding to Japanese Application No. 2016-535472 dated Feb. 28, 2017, 6 pages.
Office Action Corresponding to Application No. GB1414797.9; Date of Report: Sep. 13, 2016; 4 Pages.
Second Office Action and English-language translation, Chinese Patent Application No. 201480057709.3, dated May 24, 2018, 23 pages.

* cited by examiner

| Mode | Customer Behaviour Changes (vs. std) | HEV System Behaviour Changes | VSC Behaviour in SEV |
|---|---|---|---|
| SEV | | Nominal SOC setpoint increased to ~60%. | |
| | EV availability significantly increased | Charging load with engine running greater than default mode. | |
| | | Engine forced on above ~35mph with accel pedal pressed. | |
| | | Engine less likely to latch on in corners. | Cornering inhibit thresholds SEV dependent. |
| | | Battery fully charged when in P/N after min SOC reached or when engine revved. | P/N charge mode and SOC target cal made SEV dependent. |
| | Reduced time with EV not available after min SOC reached. | Battery charges at all times in low SOC latch (35% - 41%). Stop start less accessible. | Stop start threshold dependent on SEV mode. |
| | | | Stationary charging enable flag SEV dependent. |
| | | | Vehicle speed threshold for shutdown in latch SEV dependent. |
| | | | Overrun charging switched on in SEV only. |
| | Maximum performance less accessible (preserving SOC for EV mode). | EM torque boost only available with high pedal input / kickdown | Max PT torque from VSC made pedal and mode dependent. |
| | Transient performance reduced (preserving SOC for EV mode) | Torque filling restricted in SEV. | Torque fill level made calibratable dependent on mode |

FIGURE 4

Hev Performance Accessibility Matrix

| Shifter | TR Program (Auto TR or manual) | Standard Calibration | SEV Calibration | SHI Calibration | TIP Calibration |
|---|---|---|---|---|---|
| D/R | General Program | Torque filling = Full (but calibratable for Std) Boost = Full | Torque filling = Limited Boost = Restricted | Torque filling = Full Boost = Restricted | Torque filling = Full Boost = Full |
| S | General Program | Torque filling = Full Boost = Full | Torque filling = Full Boost = Full | Torque filling = Full Boost = Full | Torque filling = Full Boost = Full |
| D/R | GGS | Torque filling = Full Boost = Full | NA | Torque filling = Full Boost = Full | Torque filling = Full Boost = Full |
| S | GGS | Torque filling = Full Boost = Full | NA | Torque filling = Full Boost = Full | Torque filling = Full Boost = Full |
| D/R | MR | Torque fillings Full Boost = Full | NA | Torque filling = Hull Boost = Full | Torque filling = Full Boost = Full |
| S | MR | Torque filling = Full Boosts Full | NA | Torque filling = Full Boost = Full | Torque filling = Full Boosts = Full |
| D/R | Sand | Torque filling = Full Boosts Full | NA | Torque filling = Full Boosts Full | Torque filling = Full Boosts Full |
| S | Sand | Torque filling = Full Boost = Full | NA | Torque filling = Full Boost = Full | Torque filling = Full Boosts Full |
| D/R | Rock (RC) | Torque filling = Full Boosts Full | NA | Torque filling = Full Boost = Full | Torque filling = Full Boosts Full |
| S | Rock (RC) | Torque filling = Full Boost = Full | NA | Torque filling = Full Boost = Full | Torque filling = Full Boosts Full |
| D/R | Dynamic | Torque filling = Full Boost = Full | NA | Torque filling = Full Boost = Full | Torque filling = Full Boost = Full |
| S | Dynamic | Torque filling = Full Boost = Full | NA | Torque filling = Full Boost = Full | Torque filling = Full Boost = Full |

Definitions
Torque filling = Full - torque fill allowed up to full EM capability
Torque filling = Limited - torque filling limited to a calibratable ratio of EM torque capability
Boost = Full - boost accessible as soon as max engine torque reached (as VSC15)
Boost = Restricted - boost not available until pedal > threshold (expected to be ~90%)

FIGURE 5

HYBRID ELECTRIC VEHICLE CONTROLLER AND METHOD

RELATED APPLICATIONS

This application is a 35 U.S.C. § 371 national stage application of PCT Application No. PCT/EP2014/067756, filed on Aug. 20, 2014, which claims priority from Great Britain Patent Application No. 1314989.3 filed on Aug. 21, 2013, the contents of which are incorporated herein by reference in their entireties. The above-referenced PCT International Application was published in the English language as International Publication No. WO 2015/024974 A1 on Feb. 26, 2015.

TECHNICAL FIELD

The present invention relates to hybrid electric vehicles. In particular embodiments of the invention relates to hybrid electric vehicles operable in a parallel mode.

BACKGROUND

It is known to provide a hybrid electric vehicle having an internal combustion engine operable to provide drive torque to drive the vehicle and an electrical propulsion motor operable to provide drive torque when the vehicle is operated in an electric vehicle (EV) mode. A vehicle control system determines when to switch the internal combustion engine on or off, and when to open or close a clutch KO between the engine and a transmission. In some vehicles the electric propulsion motor is integrated into the transmission.

It is also known to provide an electric machine as a starter for cranking the engine when an engine start is required. Known starters include belt-integrated starter/generators. Such devices are operable as electrical generators driven by the engine as well as a starter. The vehicle may include a belt integrated starter generator in addition to a starter for starting the engine, in some embodiments.

SUMMARY OF THE INVENTION

Embodiments of the invention may be understood with reference to the appended claims.

Aspects of the present invention provide a control system, a vehicle and a method.

In an aspect of the invention for which protection is sought there is provided a controller for a parallel hybrid electric vehicle having a powertrain comprising an engine, electric propulsion means powered by energy storage means, and electric generator means operable to be driven by the engine to recharge the energy storage means, the controller being operable to:

receive one or more signals indicative of one or more operating modes in which the vehicle is to be operated at a given moment in time, the one or more operating modes being selected from a plurality of operating modes;

receive a signal indicative of demanded powertrain drive torque; and cause the engine and electric propulsion means to deliver drive torque to one or more wheels to drive the vehicle in dependence on the signal indicative of demanded powertrain drive torque, the controller being operable to cause the powertrain to operate in a parallel powertrain mode in which when the vehicle is operating with the engine delivering drive torque to the one or more wheels the controller is operable to cause the electric propulsion means to apply drive torque to the one or more wheels in addition to the engine, the amount of torque delivered by the electric propulsion means being determined by the controller at least in part in dependence on the signal indicative of demanded powertrain drive torque and the one or more signals indicative of the one or more operating modes in which the vehicle is to be operated.

Embodiments of the invention have the advantage that the controller may manage electrical energy usage by the electric propulsion means according to the required one or more operating modes. This is achieved by controlling the amount of additional drive torque delivered by the electric propulsion means according to the required one or more operating modes. This feature enhances substantially a flexibility of a vehicle designer in optimising the performance of a vehicle for a given operating mode or combination of operating modes.

The vehicle designer may for example seek to balance vehicle driveability in a given mode with a desire to conserve an amount of energy stored in the energy storage means. Accordingly, the designer may seek to permit increased amounts of drive torque to be provided by the electric propulsion means in addition to that provided by the engine when operating in certain modes, such as one or more modes optimised for travel over rough or off-road terrain, or one or more modes optimised for performance-oriented driving such as motor sports.

Thus the amount of torque developed by the electric propulsion means may be made adaptive to the particular vehicle operating mode. A responsiveness of a vehicle powertrain to drive torque demand may therefore by adapted to a particular operating mode.

The signal indicative of demanded powertrain drive torque may be generated in response at least in part to driver demand, for example via an accelerator control such as an accelerator control pedal. Alternative the signal may be generated at least in part by a speed control system such as an on-highway cruise control system, an off-highway cruise control system or any other suitable system.

The parallel powertrain mode refers to how the engine and electric propulsion means are configured to deliver the required drive torque to the wheels, the particular configuration being in dependence on the controller inputs of the signal indicative of demanded powertrain drive torque and of the one or more signals indicative of the one or more operating modes in which the vehicle is to be operated. The engine and electric propulsion means may be configured to operate in a plurality of different configurations. Different combinations of said controller inputs may result in the same controller output powertrain configuration (i.e. the same parallel powertrain mode).

The controller may be operable to determine the amount of torque that is required to be delivered by the electric propulsion motor in dependence at least in part on the one or more signals indicative of one or more vehicle operating modes only when a difference exists between the amount of torque delivered by the engine and the amount of demanded powertrain drive torque.

Optionally, the one or more operating modes include one or more transmission operating modes.

The transmission operating modes may include at least one selected from amongst a drive mode, a reverse mode and a sport mode. The sport mode may be a performance-oriented transmission mode in which gear shift information is modified compared with that employed in the drive mode so as to cause one or more upshifts to occur at higher engine speeds. The transmission may therefore be held in a lower gear for longer periods of time.

Further optionally, the one or more operating modes may include one or more driving operating modes, wherein in each driving operating mode each of a plurality of selected vehicle sub-systems are caused to operate in a respective one of a plurality of sub-system operating modes.

The driving modes may correspond to terrain response modes.

Optionally, the plurality of selected vehicle sub-systems include at least one selected from amongst a powertrain controller arranged to select a correspondence between accelerator control and powertrain torque in dependence at least in part on the driving operating mode, a suspension control system and a brake control system.

Optionally, the controller is further operable to cause the powertrain to operate in an engine charging parallel mode in which the engine drives the generator means to recharge the energy storage means or an electric vehicle (EV) mode in which the engine is switched off and the electric propulsion means is operable to develop drive torque to drive the vehicle.

Optionally, the one or more operating modes include a plurality of hybrid operating modes,
the controller being operable to receive a signal indicative of a state of charge of the energy storage means and to determine which of the plurality of powertrain modes is appropriate for the vehicle at a given moment, the controller being operable to determine which of the plurality of powertrain modes is appropriate in dependence at least in part on the selected hybrid operating mode, the signal indicative of the instant state of charge of the energy storage means and a reference value of state of charge, the controller being operable to set the reference value of state of charge to one of a plurality of different respective values in dependence on the required hybrid operating mode.

The hybrid operating modes may include a general hybrid operating mode which may also be referred to as a default or baseline hybrid operating mode and a selectable electric vehicle (SEV) operating mode.

It is to be understood that by changing the reference value of state of charge, the controller may be configured to influence the amount of charge available for operation in the EV mode so as to favour operation in the EV mode. Operation in the EV mode may be favoured in the SEV mode compared with the general hybrid operating mode.

This feature has the advantage that the controller may manage use of electrical charge in providing additional drive torque by means of the electric propulsion means in further dependence on user preference in respect of powertrain mode.

The controller may be operable to determine the appropriate powertrain mode in dependence at least in part on a deviation of the signal indicative of the instant state of charge from the reference value of state of charge.

It is to be understood that in some embodiments the controller may be arranged to promote charging of the energy storage means to a higher state of charge when the powertrain is in the engine charging mode, favouring operation of the powertrain in the EV mode for longer periods when the engine is switched off.

The controller may be operable to determine which of the powertrain modes is appropriate at a given moment in time according to a value of a cost function for each powertrain mode, the value of the cost function being determined at least in part by reference to the signal indicative of the instant state of charge and the reference value of state of charge of the respective powertrain operating modes.

The value of the cost function of each powertrain mode may be determined at least in part in further dependence on at least one selected from amongst a rate of fuel consumption of the vehicle in a given powertrain mode, a rate of emission of a gas by the vehicle in a given powertrain mode and an amount of noise generated by the vehicle in a given powertrain mode.

The controller may be configured to determine the required powertrain mode according to a feedback Stackelberg equilibrium control optimisation methodology.

Such a methodology is known, and may be understood for example by reference to UK patent application GB1115248.5.

In some embodiments, the cost function is responsive at least in part to a rate of fuel consumption of the vehicle, a rate of emission of a gas by the vehicle and a deviation of a state of charge of the energy storage means from the reference value.

Optionally, the controller may be operable to determine the amount of additional torque to be delivered by the electric propulsion motor in further dependence on a signal indicative of a position of an accelerator control, the controller being operable to prevent additional drive torque from being delivered in dependence on the signal indicative of accelerator control position.

The accelerator control may be an accelerator pedal control. The signal indicative of accelerator pedal position may correspond to an amount by which the control has been actuated relative to full scale actuation.

The controller may be operable to prevent additional drive torque from being delivered unless the accelerator pedal position exceeds a prescribed position.

The provision of additional drive torque may be prevented unless the driver demand for torque exceeds a prescribed amount, determined in dependence on accelerator pedal position. This may reduce the likelihood that the additional drive torque is commanded by the control means when a user is willing to accept a lower powertrain drive torque in order to conserve the amount of energy stored in the energy storage means.

The controller may be operable to cause the powertrain to operate in a parallel boost mode in which the powertrain causes the electric propulsion means to apply drive torque to the one or more wheels in addition to the engine in order to meet powertrain torque demand when the powertrain torque demand exceeds the maximum steady state engine output torque.

Optionally, the controller may be operable to cause the powertrain to operate in a parallel torque filling mode in which the powertrain causes the electric propulsion means to apply drive torque to the one or more wheels in addition to the engine in order to meet powertrain torque demand more quickly when an amount of powertrain demanded torque is less than the maximum steady state engine torque but exceeds the instant amount of torque developed by the engine.

The amount of drive torque applied by the electric propulsion means may be limited to a prescribed proportion of the torque capability of the electric propulsion means. The torque capability may be defined in terms of the maximum possible capability; alternatively the torque capability may be defined in terms of the maximum capability in the present condition of the electric propulsion means (for example, taking into account instant temperature of the electric propulsion means, the presence of any torque derating imposed, and/or one or more other parameters).

In a further aspect of the invention for which protection is sought there is provided a method of controlling a parallel hybrid electric vehicle having a powertrain comprising an engine, electric propulsion means powered by energy storage means, and electric generator means operable to be driven by the engine to recharge the energy storage means, the method implemented by a controller and comprising:

receiving one or more signals indicative of one or more operating modes in which the vehicle is to be operated at a given moment in time, the one or more operating modes being selected from a plurality of operating modes;

receiving a signal indicative of demanded powertrain drive torque; and causing the engine and electric propulsion means to deliver drive torque to one or more wheels to drive the vehicle in dependence on the signal indicative of demanded powertrain drive torque, the method comprising causing the powertrain to operate in a parallel powertrain mode in which the engine is caused to deliver drive torque to the one or more wheels and the electric propulsion means is caused to apply drive torque to the one or more wheels in addition to the engine, the method comprising determining the amount of torque to be delivered by the electric propulsion means at least in part in dependence on the signal indicative of demanded powertrain drive torque and the one or more signals indicative of the one or more operating modes in which the vehicle is to be operated.

In a further aspect of the invention for which protection is sought there is provided a computer readable medium carrying computer program code for controlling a vehicle to carry out a method according to a preceding aspect.

It is to be understood that in some embodiments of the invention the controller is operable independently to configure the availability of transient and steady state torque assistance applied to one or more wheels by the electric propulsion means in addition to the engine. The torque assistance may be provided in the form of 'torque fill' where the electric propulsion means provides 'fill in' torque during the delay between demanding a required amount of torque and delivery by the engine of the required torque. The delay is typically attributed at least in part to inertia of components of the engine as the speed of rotation of the engine increases. The torque may in addition or instead be provided in the form of 'torque assist' where the electric propulsion means provides drive torque in addition to the engine to reduce torque demand on the engine, during steady state driving conditions where the engine is otherwise capable of delivering the required powertrain torque alone. The torque may in addition or instead be provided in the form of 'torque boost' where the electric propulsion means delivers drive torque in addition to the engine, which delivers the maximum available engine torque. The total amount of powertrain torque generated may therefore be up to the maximum available powertrain torque in some embodiments. The availability of torque fill, torque assist and torque boost in each available combination of vehicle operating modes is controlled by the controller according to a trade-off between expected vehicle performance in a given mode and a desire for reduced fuel consumption.

The vehicle operating modes may include a terrain response mode such as a grass, gravel or snow mode; a winter mode optimised for travel over surfaces of relatively low surface coefficient of friction; a mud and ruts mode; a sand mode; a rock crawl mode; a general mode configured for operations on a relatively smooth surface with a relatively high surface coefficient of friction; and a dynamic mode configured for operations on a relatively smooth surface with a relatively high surface coefficient of friction at relatively high rates of acceleration and deceleration during straight line driving and cornering. The operating modes may include transmission operating modes such as a low range mode, a high range mode, reverse mode, drive mode, sport mode and a command shift mode. In addition or alternatively the operating modes may include hybrid driving modes such as a standard, general or default hybrid driving mode, a selectable EV hybrid driving mode, an EV driving mode, and an 'auto stop-start off' driving mode which may also be referred to as a 'hybrid inhibit' driving mode. The latter mode may correspond to the default hybrid driving mode but with the engine latched on substantially permanently.

In general, in embodiments of the present invention:

torque boost in some embodiments is not provided until a relatively high threshold of accelerator demand is reached, unless in a sporty operating mode such as sport mode or the dynamic mode, or on terrain where boost will facilitate progress such as, optionally, in the Sand operating mode.

torque fill may be restricted to a percentage of the available electric machine torque in normal driving; torque fill may be configured independently for both Reverse/Drive and Sport transmission modes in order to provide an optimised balance, for the expected driving style and driving cycle, of:

the beneficial effect of torque fill on reducing engine loads during acceleration using energy captured from regenerative braking (thus improving emissions and fuel economy), the detrimental effect of torque fill reducing the available electrical energy if this energy subsequently needs to be recovered using the combustion engine as a generator, the responsiveness to driver demanded torque.

Torque fill up to the instantaneous available capability may be fully available in modes where torque fill is a desirable enabler to:

fine torque control for controlled progress on off-road or low friction surfaces (as in all terrain response programs other than general terrain response mode, or 'special programs off' mode), sporty driving (as in Dynamic Program and Command Shift).

Torque assist and torque fill may be reduced in Selectable EV Mode to preserve electrical energy for subsequent EV driving in order to meet a user preference for operation in the EV powertrain mode.

Within the scope of this application it is envisaged that the various aspects, embodiments, examples, features and alternatives set out in the preceding paragraphs, in the claims and/or in the following description and drawings may be taken independently or in any combination. Features described with reference to one embodiment are applicable to all embodiments, unless there is incompatibility of features.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

Embodiments of the invention will now be described with reference to the accompanying figures in which:

FIG. 4 is a table illustrating changes in vehicle behaviour when operating in the SEV mode compared with operation in the HEV mode; and FIG. 5 is a table illustrating availability of torque filling and torque boost functionality as a function of hybrid operating mode, driving operating mode and transmission operating mode.

DETAILED DESCRIPTION

Figure 1:
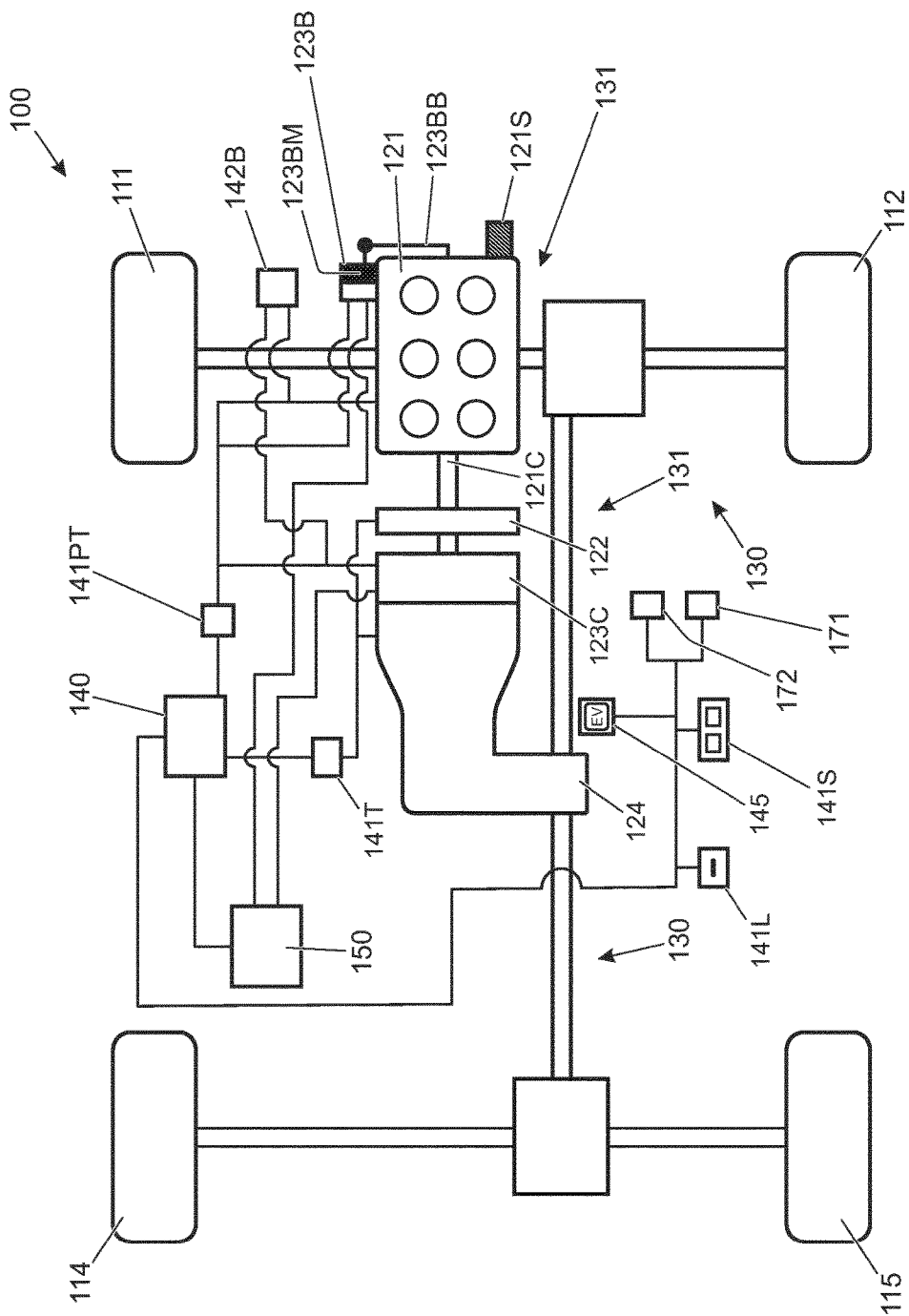
FIG. 1 is a schematic illustration of a hybrid electric vehicle according to an embodiment of the present invention.

In one embodiment of the invention a hybrid electric vehicle 100 is provided as shown in FIG. 1. The vehicle 100 has an engine 121 coupled to a belt integrated starter generator (BISG) 123B. The BISG 123B may also be referred to as a belt integrated (or belt mounted) motor generator and is operable to crank the engine 121 when starting is required. In addition or instead, a dedicated starter motor may be provided. In some embodiments therefore, a BISG may be provided but a separate starter motor is employed for starting the engine 121. The engine 121 is coupled in turn to a crankshaft-integrated starter/generator (CIMG) 123C by means of a clutch 122. The clutch 122 may also be referred to as a K0 clutch 122.

The CIMG 123C is integrated into a housing of a transmission 124 which is in turn coupled to a driveline 130 of the vehicle 100 thereby to drive a pair of front wheels 111, 112 and a pair of rear wheels 114, 115 of the vehicle 100. The driveline 130 in combination with the transmission 124, CIMG 123C, clutch 122, engine 121 and BISG 123B may be considered to form part of a powertrain 131 of the vehicle 100. Wheels 111, 112, 114, 115 arranged to be driven by the driveline 130 may also be considered to form part of the powertrain 131.

It is to be understood that other arrangements are also useful. For example the driveline 130 may be arranged to drive the pair of front wheels 111, 112 only or the pair of rear wheels 114, 115 only, or to be switchable between a two wheel drive mode in which the front or rear wheels only are driven and a four wheel drive mode in which the front and rear wheels are driven.

The BISG 123B and CIMG 123C are arranged to be electrically coupled to a charge storage module 150 having a battery and an inverter. The module 150 is operable to supply the BISG 123B and/or CIMG 123C with electrical power when one or both are operated as propulsion motors. Similarly, the module 150 may receive and store electrical power generated by the BISG 123B and/or CIMG 123C when one or both are operated as electrical generators. In some embodiments, the CIMG 123C and BISG 123B may be configured to generate different electrical potentials to one another. Accordingly, in some embodiments each is connected to a respective inverter adapted to operate at the corresponding potential of the CIMG 123C or BISG 123B. Each inverter may have a respective battery associated therewith. In some alternative embodiments the CIMG 123C and BISG 123B may be coupled to a single inverter which is adapted to receive charge from the CIMG 123C and BISG 123B at the respective potentials and to store the charge in a single battery. Other arrangements are also useful.

As noted above, the BISG 123B has an electric machine 123BM that is drivably coupled to a crankshaft 121C of the engine 121 by means of a belt 123BB. The BISG 123B is operable to provide torque to the crankshaft 121C when it is required to start the engine 121 or when it is required to provide torque-assist to the driveline 130 as discussed in further detail below.

The vehicle 100 has a vehicle controller 140 operable to command a powertrain controller 141PT to control the engine 121 to switch on or off and to generate a required amount of torque. The vehicle controller 140 is also operable to command the powertrain controller 141PT to control the BISG 123B to apply a required value of positive or negative torque (operating as a propulsion motor or a generator) to the engine 121. Similarly, the vehicle controller 140 may command the CIMG 123C to apply a required value of positive or negative torque (again operating as a propulsion motor or a generator) to the driveline 130 via the transmission 124.

The vehicle has an accelerator pedal 171 and a brake pedal 172. The accelerator pedal 171 provides an output signal to the vehicle controller 140 indicative of an amount by which the pedal 171 is depressed. The vehicle controller 140 is arranged to determine the amount of driver demanded torque based on the accelerator pedal position and one or more other vehicle parameters including engine speed W.

The vehicle 100 of FIG. 1 is operable by the vehicle controller 140 in an electric vehicle (EV) mode in which the clutch 122 is open and the crankshaft 121C is stationary. In EV mode the CIMG 123C is operable to apply positive or negative torque to the driveline 130 via the transmission 124. Negative torque may be applied for example when regenerative braking is required under the control of a brake controller 142B.

The powertrain 131 is operable in one of a plurality of parallel modes in which the engine 121 is switched on and the clutch 122 is closed. The parallel modes include a 'parallel boost' mode in which the CIMG 123C is operated as a motor to provide drive torque to the driveline 130 in addition to the torque provided by the engine 121. In the present embodiment the powertrain 131 is operated in the parallel boost configuration when the amount of driver demanded torque exceeds the maximum torque available from the engine 121. The amount of additional torque available from the CIMG 123C may be determined in dependence on the vehicle configuration as described in more detail below. It is to be understood that the feature of torque boost increases the available drive torque beyond that which is available from the engine 121 alone.

The parallel modes also include a parallel torque filling mode and a parallel torque assist mode. The parallel torque filling mode is a mode in which the CIMG 123C delivers drive torque to the driveline 130 in addition to the engine 121 in order to meet driver demand for torque more quickly than if the engine 121 alone delivers drive torque. Torque filling provides the benefit that driver torque demand may be satisfied more quickly, improving a responsiveness of the vehicle to an increase in torque demand.

In the present embodiment torque filling is implemented when a rate of increase of driver torque demand relative to the amount of torque delivered by the engine 121 exceeds a prescribed value. Once driver torque demand has been satisfied, the amount of torque delivered by the CIMG 123C decreases as the amount of torque delivered by the engine 121 increases to meet driver demand substantially entirely, without a requirement for additional torque from the CIMG 123C.

In the torque-assist parallel mode the CIMG 123C provides steady-state drive torque in addition to the engine 121 in order to relieve loading on the engine 121. This may assist in reducing fuel consumption. Torque-assist may be considered to be distinct from 'torque filling', the latter being employed in a transient manner when an increase in drive torque is required.

The powertrain 131 may alternatively be operated in a parallel recharge mode in which the CIMG 123C is driven as a generator by the engine 121 to recharge the charge storage module 150.

In the present embodiment, the vehicle 100 is also operable in one or more operating modes. The operating modes include (but are not limited to) hybrid operating modes, driving operating modes and transmission operating modes, as described below.

The vehicle 100 is operable in one of a plurality of said hybrid operating modes. The hybrid operating modes include a default hybrid electric vehicle (HEV) operating mode and a user-selectable EV hybrid operating mode, referred to herein as a 'selectable EV operating mode' (SEV operating mode). The SEV operating mode is selected by a user by means of SEV selector button 145 accessible to a driver whilst driving. When depressed, the SEV button 145 illuminates to confirm the SEV operating mode has been selected.

In the present embodiment the vehicle 100 is also operable in a selectable hybrid inhibit (SHI) hybrid operating mode in which the controller 140 causes the engine 121 to latch in the on condition, and in a command shift or 'tip shift' (TIP) hybrid operating mode.

Whether the vehicle is operating in the HEV hybrid operating mode, the SEV hybrid operating mode, the SHI hybrid operating mode or the TIP operating mode the controller 140 is configured to determine in which available powertrain mode the powertrain 131 should be operated in dependence on an energy optimisation strategy that employs game theory. It is to be understood that in the SHI hybrid operating mode the EV mode is not available since the engine 121 is latched in the on condition. The controller 140 is configured to take this factor into account in determining the required powertrain mode, however in the present embodiment the controller 140 still employs the same energy optimisation strategy. Other arrangements are also useful. The SHI hybrid operating mode may otherwise be considered to correspond to the HEV hybrid operating mode.

The non-cooperative approach of game theory is applied by considering a multi-stage game played by the following two players: a) a first player, the driver, represented by a discrete set of load sites (for example wheel torque, wheel speed and gear selected), covering the powertrain capability, and b) a second player, the powertrain, represented by a discrete set of operating modes.

The first player is interested in minimizing a cost functional while the second player is interested in maximizing the cost functional. The cost functional is formed as a sum of incremental cost values over a finite horizon.

In respect of the embodiment of FIG. 1 the cost functional of the game is based on the following incremental cost function L related to the control action, u, the state vector, x, and the operating variable, w:

$$L(x, u, w) = \alpha \times \text{Fuel}(u, w) + \beta \times \text{NO}x(u, w) + \mu \times [\text{SoC}_{SetPoint} - (x - \Delta \text{SoC}(u, w))]^2 + \gamma \times G(w)$$

where $u \in U$ is the control action (U is the set of powertrain modes in this case which include the parallel boost mode and parallel recharge mode), $x \in X$ is the state vector (X is the set of discretised high voltage battery SoC (state of charge) values in this case) and $w \in W$ is the vector of operating variables which is also referred to as the load site (discretised wheel speed, wheel torque and gear selected in this case). In the above equation, Fuel denotes engine fuel consumption, NOx denotes engine NOx emission mass flow rate, $\text{SoC}_{SetPoint}$ denotes the desired SoC set-point at the end of the cycle, $\Delta \text{SoC}(u, w)$ denotes the deviation of SoC resulting from a defined control action at a given load site.

Here G denotes a positive Gaussian function with the centre at the centre of mass of a defined drive cycle, introduced to focus the optimization on specific load sites.

In the present embodiment, the value of SoC set-point (which may be referred to also as a target value or a reference value) is changed in dependence on whether the vehicle 100 is operated in the SEV mode, the HEV mode or the TIP mode. The SoC set-point may also be changed in dependence on transmission operating mode. The value of SoC set-point is set to a higher value for operation in the SEV mode, TIP mode and transmission sport operating mode (when in the HEV mode) compared with operation in the HEV mode in the drive transmission operating mode in order to promote charging of the charge storage module 150. In the present embodiment, if the vehicle 100 is operated in the SEV mode, TIP mode or if the transmission 124 is operated in the sport mode whilst in HEV mode, the value of SoC set-point (that is, Game Theory setpoint, also referred to as target value or reference value) is set to 65% (other values are also useful) whilst if the vehicle 100 is operated in the HEV mode (with the transmission in the drive mode) the value of SoC set-point is set to 52%. Other values are also useful. Similarly, other values of SoC set-point whilst operating in various hybrid and transmission operating modes are also useful. The fact that the value of SoC set-point is set to a higher value in the SEV mode causes the controller 140 to tend to charge the charge storage module 150 to higher values of state of charge (SoC). For operation in the SHI and TIP hybrid modes, the SoC set-point may be set to the same value as the HEV mode, or to any other suitable value.

Figure 2:
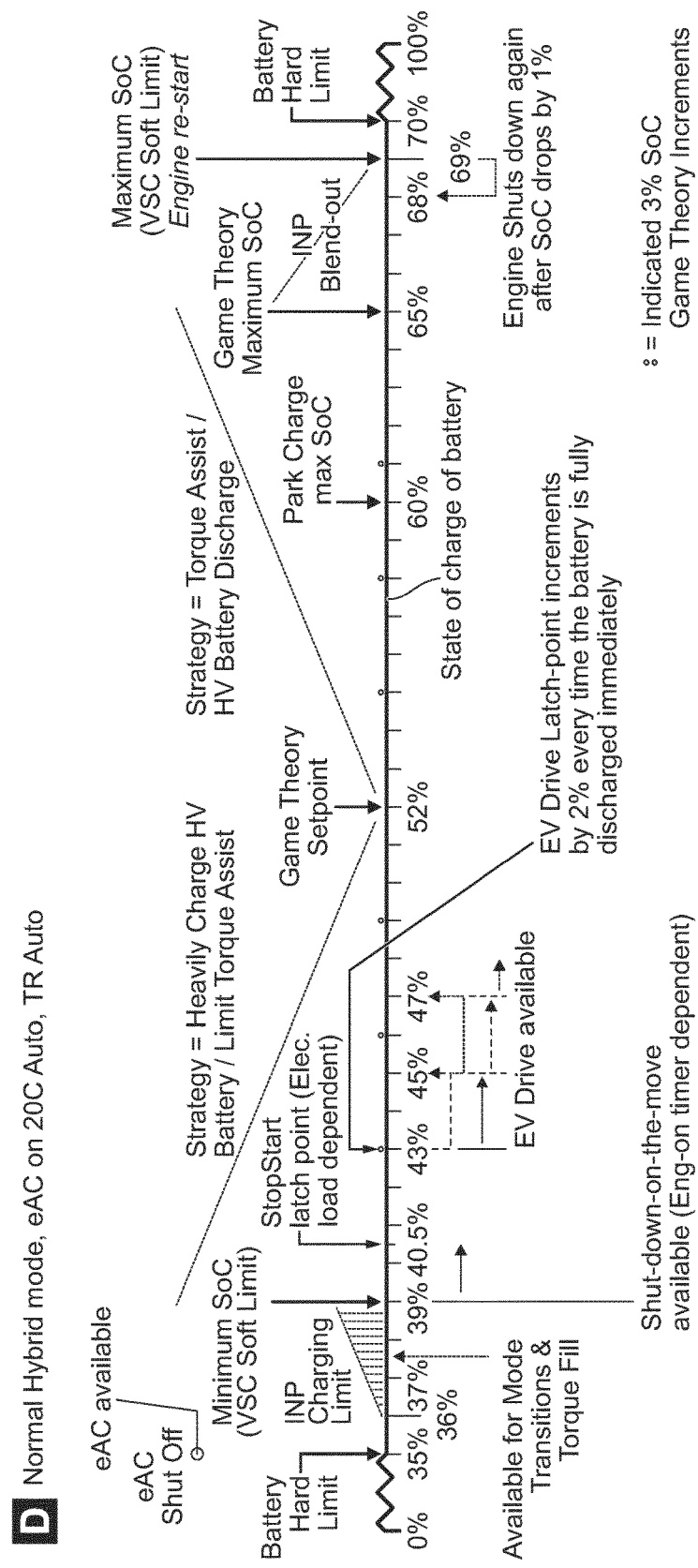
FIG. 2 illustrates operation of the vehicle of FIG. 1 in a general hybrid electric vehicle (HEV) driving mode.
Figure 3:
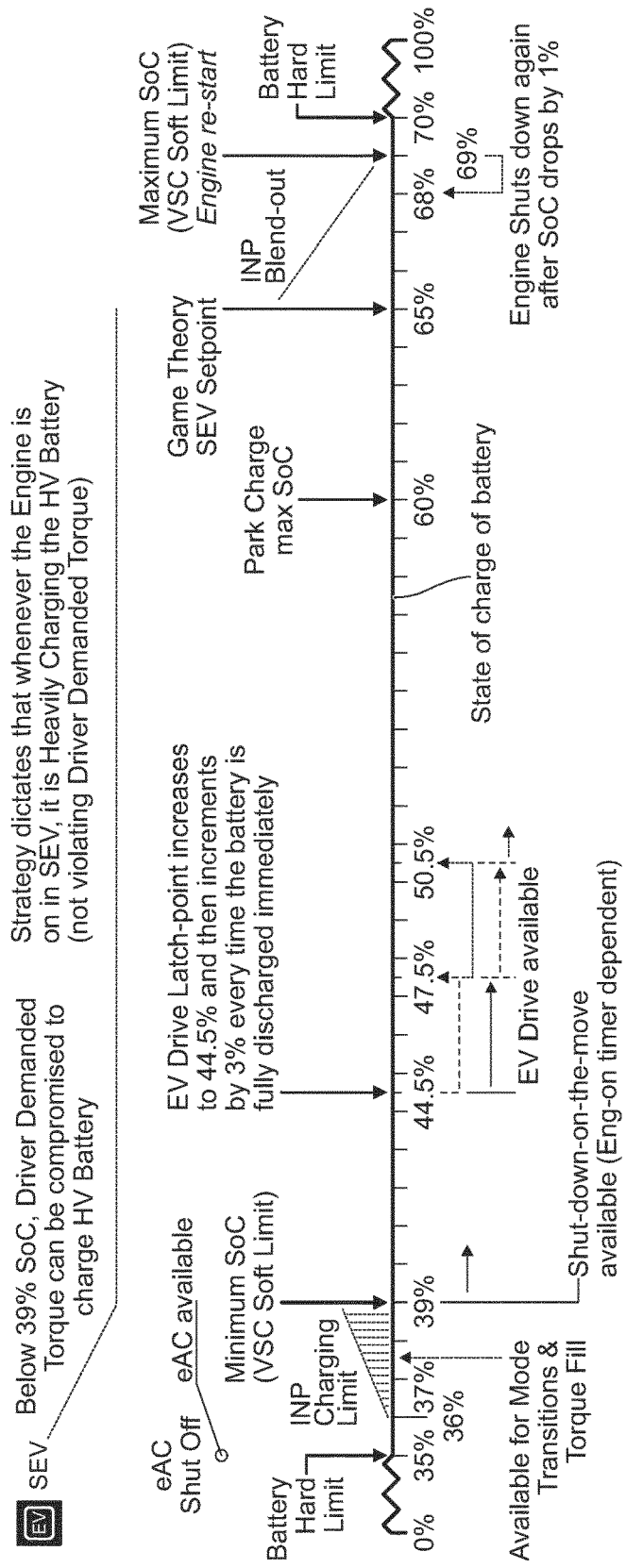
FIG. 3 illustrates operation of the vehicle of FIG. 1 in a selectable electric vehicle (SEV) driving mode.

FIG. 2 and FIG. 3 are graphical illustrations of the manner in which the controller 140 causes the vehicle 100 to operate when the HEV and SEV driving modes are selected, respectively. The figures show state of charge of the charge storage module 150 along a horizontal axis. The content of the figures will now be discussed.

In order to promote operation of the vehicle 100 in the EV mode when the vehicle is in the SEV mode, the controller 140 is configured to implement the following measures:

(a) When in SEV mode, the rate of charging of the charge storage module 150 when the powertrain is in the parallel recharge mode is increased relative to that employed in the HEV mode. The vehicle 100 is therefore able to spend longer periods of time in the EV mode for a given drive cycle, satisfying the user requirement to increase the time in which the powertrain 131 spends in the EV powertrain mode.

(b) When in SEV mode, the engine 121 is forced to turn on at a higher engine-on threshold vehicle speed compared with operation in the HEV mode. In the present embodiment the engine 121 is forced to turn on when vehicle speed exceeds 35 mph and the accelerator pedal 171 is depressed, compared with 30 mph in the HEV mode. Other values are also useful. This feature reduces the chances of the engine 121 being switched on when a user is attempting to maintain a speed of 30 mph, for example when driving on a road having a speed limit of 30 mph. Thus the engine-on threshold speed may be set to a value exceeding that of a prevailing speed limit. If the accelerator pedal 171 is not depressed, the engine 121 may remain off even though vehicle speed exceeds the engine-on threshold. This is so as to avoid switching the engine 121 on unnecessarily when the engine-on threshold is exceeded, for example when coasting downhill.

(c) If the engine 121 switches on whilst the vehicle 100 is cornering in SEV mode, the controller 140 allows the engine 121 to switch off if the energy optimisation strategy determines this should be undertaken. In contrast, if the vehicle is operating in the HEV mode and the engine 121 switches on during cornering, the engine 121 is latched in the on state until the corner has been negotiated and the value of lateral acceleration falls below a prescribed value, indicative that the vehicle is no longer cornering, for a prescribed period of time, such as 5s or more.

(d) If the transmission 124 of the vehicle 100 is placed in the park or neutral mode and a minimum allowable state of charge of the charge storage module 150 has been reached or is reached, the energy storage module 150 is charged at the maximum allowable rate of charge whenever the engine 121 develops sufficient power (or operates at a sufficiently high speed) to enable the CIMG 123C to be driven as a generator.

In some embodiments charging may not be performed if the engine is operating at idle speed, however if the engine speed is subject to an increase in response to depression of an accelerator pedal 171 by a driver the controller 140 takes the opportunity to recharge the energy storage module 150 by means of the CIMG 123C at as high a rate as can be achieved. In some embodiments the controller 140 may cause a speed of the engine 121 to increase in order to allow charging of the charge storage module 150.

(e) If the SoC of the charge storage module 150 falls below a prescribed value (which may be referred to as a minimum SoC or soft minimum limit) when the vehicle is operating in the SEV hybrid mode, the engine 121 is latched on and the CIMG 123C is operated as a generator to recharge the charge storage module 150 at the fastest allowable rate. In contrast, in the HEV hybrid mode the controller 140 causes the CIMG 123C to recharge at a rate determined in dependence on the energy optimisation strategy. The controller 140 suspends application of game theory to determine the preferred powertrain operating mode when the SoC falls below the prescribed value. In the present embodiment the prescribed value is around 39% although other values are also useful.

It is to be understood that in known hybrid electric vehicles and electric vehicles, a battery for storing charge is only permitted to vary its SoC between prescribed values (which may be referred to as hard limits) that lie within the absolute maximum and minimum states of charge in order to prevent deterioration in battery life due to excessively high and low charge states. In the present embodiment the minimum allowable battery SoC is 35% whilst the maximum allowable SoC is 70%. Other values are also useful.

In the present embodiment, if the SoC of the charge storage module 150 reaches a value below a prescribed engine start SoC value, the controller 140 forces the powertrain to assume the parallel recharge mode until the SoC of the charge storage module 150 exceeds a prescribed minimum engine stop SoC value. Once the SoC exceeds the minimum engine stop SoC value the powertrain 131 may resume operation in the EV mode if the controller 140 determines this is the optimum mode according to the energy optimisation strategy. If the powertrain 131 resumes operation in the EV mode once the SoC exceeds the prescribed minimum engine stop SoC value following an engine start due to the SoC falling below the engine start SoC value, the minimum engine stop SoC value is incremented by a prescribed increment amount. In the present embodiment, the prescribed increment amount is higher when operating in SEV mode compared with HEV mode although in some embodiments the increment amounts may be substantially equal. This feature has the effect that when the engine 121 is next started, it must charge the energy storage module 150 to a higher SoC before the engine 121 may be switched off, increasing the available charge for operation in EV mode.

In the present embodiment, when operating in HEV mode the prescribed increment amount is 2% each time the engine is stopped as soon as the SoC reaches the minimum engine stop SoC value. When operating in SEV mode the prescribed increment amount is 3%. Other values are also useful.

Advantageously, the minimum engine stop SoC is higher when operating in the SEV mode compared with the HEV mode. This allows longer uninterrupted periods of operation in EV mode in a number of situations. In the present embodiment the minimum engine stop SoC is around 43% when operating in HEV mode and around 44.5% when operating in SEV mode. Other values are also useful.

This feature has the advantage that a time period for which the powertrain 131 operates in EV mode may be increased.

When the powertrain 131 is operated in a parallel mode, the controller 140 is operable to assume the parallel torque boost mode when an amount of driver torque demand exceeds that which may be provided by the engine 121 alone at its maximum torque output. As noted above, driver torque demand is related to accelerator pedal position. In the SEV mode, the controller 140 limits provision of torque boost to situations in which the accelerator pedal is depressed more than a prescribed amount (which may be specified in terms of a proportion of full travel in some embodiments). In the present embodiment, when the vehicle is operated in the SEV mode the parallel torque boost mode is only permitted when the accelerator pedal 171 is depressed by more than 95%, corresponding to movement of the pedal 171 beyond the 'kick down' detent in the present embodiment. Other arrangements are also useful. However, this feature advantageously reduces draining of charge from charge storage module 150 relative to operation in the HEV hybrid operating mode.

In some embodiments the controller 140 may suspend provision of torque boost in the SEV mode altogether.

Furthermore, the provision of torque filling is also restricted when in the SEV mode compared with the HEV mode. In some embodiments torque filling is not permitted in the SEV mode. In some embodiments, torque filling in an EV mode is restricted according to a strategy based on vehicle speed and gear position. In an embodiment, torque filling is not generally permitted (it is either not permitted, or only a percentage of torque fill is available, depending on speed and/or gear selection) when the vehicle is in an EV mode, such as for example a SEV mode, unless a low gear such as first and/or second is selected, and speed is low—for example, less than 10 mph or less than 5 mph. At those speeds and/or in those gears, torque fill is fully permitted and fully available. This ensures that performance in particular situations, such as from a low speed or standing start (sometimes known as 'pullaway' performance) is not compromised. Other speeds and gear ratios are useful and may vary according to various characteristics of the vehicle in question, such as number of gear ratios available, available torque and power of engine and/or electric machine, and so on, as well as the particular EV mode selected.

In some embodiments, engine overrun charging (i.e. use of the engine to drive the CIMG 123C in order to slow the vehicle when the engine 121 is switched on) is not permitted in the HEV mode, but is permitted in the SEV mode. Other arrangements are also useful.

It is known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or control modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions may be linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller. The driving modes may also be referred to as terrain modes, terrain response modes, or control modes. The modes may include modes configured according to a driving style of a user. It is known for example to provide a 'dynamic' mode in which the sub-systems are configured for performance-oriented driving. In the dynamic mode the suspension may be caused to assume a more stiff arrangement and an accelerator pedal signal/torque demand map may be adjusted such that a greater amount of torque is demanded by an accelerator pedal for a given amount of accelerator pedal depression.

In the vehicle 100 of FIG. 1, the controller 140 is operable to implement a Terrain Response (TR)® System of the kind described above in which the controller 140 controls settings of one or more vehicle systems or sub-systems such as the powertrain controller 141PT in dependence on a selected driving operating mode. The driving operating mode may be selected by a user by means of a driving operating mode selector 141S (FIG. 1). The driving operating modes may also be referred to as terrain modes, terrain response modes, or control modes. In the embodiment of FIG. 1 six control modes are provided: (a) an 'on-highway' driving operating mode suitable for driving on a relatively hard, smooth driving surface where a relatively high surface coefficient of friction exists between the driving surface and wheels of the vehicle; (b) a 'sand' driving operating mode suitable for driving over sandy terrain; (c) a 'grass, gravel or snow' (GGS) driving operating mode suitable for driving over grass, gravel or snow; (d) a 'rock crawl' (RC) driving operating mode suitable for driving slowly over a rocky surface; (e) a 'mud and ruts' (MR) driving operating mode suitable for driving in muddy, rutted terrain; and (f) a 'dynamic' driving operating mode in which vehicle systems are configured for performance oriented driving. Other driving operating modes may be provided in addition or instead. A smaller number of driving operating modes may be provided in some embodiments.

In the present embodiment the controller 140 is operable in an automatic driving operating mode selection configuration in which the controller 140 determines automatically the most appropriate driving operating mode in dependence on the values of vehicle parameters determined by a plurality of sensors. The controller 140 causes the vehicle subsystems to assume the required corresponding control modes in dependence on the selected driving operating mode.

The controller 140 is configured to determine an extent to which the torque filling and torque boost functions are available to the powertrain 131 in dependence on the selected driving operating mode and the selected hybrid operating mode. In the present embodiment, the controller 140 is configured to permit the vehicle 100 to operate in the following operating modes:

(a) general hybrid electric vehicle or HEV hybrid operating mode (described above);

(b) selectable EV or SEV hybrid operating mode (described above);

(c) a selectable hybrid inhibit (SHI) hybrid operating mode in which the engine is latched in the on condition and engine stop/start functionality is disabled, the CIMG 123C being operated as a motor or generator as required; and (d) a command shift (TIP) hybrid operating mode in which a user may selected a required transmission gear ratio using a transmission shift lever 141L enabling an increased user control over the transmission 124 when a performance-oriented driving style is required.

In the present embodiment, the controller 140 is not permitted to allow the vehicle 100 to operate in the SEV hybrid operating mode in any driving operating mode other than the general driving operating mode. Accordingly, in the present embodiment if the vehicle is operating in the SEV hybrid operating mode and a user selects a driving operating mode other than the general driving operating mode, the controller 140 is configured to cause the vehicle 100 to terminate operations in the SEV hybrid operating mode and to commence operation in the HEV hybrid operating mode.

This feature is shown in the table presented in FIG. 5, which represents a matrix of the extent to which torque filling and torque boost is permitted in dependence on the selected driving operating mode, hybrid operating mode and transmission operating mode (whether the transmission is in the drive, reverse or sport operating modes).

If the vehicle 100 is operated in the general driving operating mode and the HEV hybrid operating mode is selected, torque filling is permitted to the maximum available torque from the CIMG 123C when the transmission 124 is in the drive or reverse operating modes. Torque filling functionality may therefore be considered to be 'full' torque filling. Torque boost functionality, however, is restricted to accelerator pedal positions that exceed 90% of full scale travel of the accelerator pedal 171. Torque boost functionality may therefore be considered to be 'restricted' or 'limited'.

If the vehicle 100 is operated in the general driving operating mode in the SEV hybrid operating mode and the transmission 124 is operated in the drive or reverse transmission operating mode, torque filling is limited to a prescribed proportion of the available torque from the CIMG 123C (i.e. to a value less than 100% of the available CIMG torque). In the present embodiment his proportion is 75% although other amounts are also useful. Torque boost functionality is limited to accelerator pedal positions that exceed 95% of full scale travel of the accelerator pedal 171, rather than 90% if the HEV hybrid operating mode is selected instead.

If the vehicle is operated simultaneously in the general driving operating mode, the SHI hybrid operating mode and the drive or reverse transmission operating modes, torque filling functionality is permitted to the maximum available torque from the CIMG 123C. Torque boost functionality is limited to accelerator pedal positions that exceed 90% of full scale travel of the accelerator pedal 171. That is, torque boost functionality is only permitted to be provided when the accelerator pedal exceeds the prescribed proportion of full scale depression.

If the vehicle 100 is operated in the general driving operating mode in the command shift (TIP) hybrid operating mode and the drive or reverse transmission operating mode is selected, torque filling is permitted to the maximum available torque from the CIMG 123C. Torque boost is also permitted to the maximum available torque from the CIMG 123C with no threshold accelerator pedal position below which torque boost is not permitted.

If the vehicle 100 is operated in the general driving operating mode in the sport transmission operating mode, full torque filling and full torque boost functionality are permitted regardless of the selected driving operating mode.

Similarly, if the vehicle 100 is operated in the GGS, MR, Sand, RC or dynamic driving operating modes in either the drive, reverse or sport transmission operating modes, the controller 140 is configured to permit full torque filling and full torque boost functionality. This is at least in part because these driving operating modes are consistent with actual or intended driving in off-road or off-highway driving conditions. Such conditions typically require increased powertrain torque in order to navigate the terrain. The torque boost and torque filling functions are therefore unrestricted in order to enhance vehicle composure by ensuring maximum powertrain torque is available at a given moment in time, subject to sufficient charge being available from the charge storage module 150.

Embodiments of the present invention have the advantage that a vehicle powertrain 131 may be controlled in an adaptive manner such that a user's preference for driving in a particular powertrain mode (such as EV mode) may be taken into account by reference to a selected hybrid operating mode (such as SEV mode, HEV mode or SHI mode) by a vehicle controller 140, in conjunction with a user's preference for driving in a particular vehicle driving operating mode and, optionally, a transmission operating mode. Accordingly, the controller 140 adjusts an extent to which torque filling and torque boost functionality of the powertrain 131 is available to optimise vehicle operation for a given combination of operating modes in which the vehicle or a system thereof may be operated. The controller 140 may also adjust an extent to which torque assist functionality is available in some embodiments.

It is to be understood that the controller 140 is configured to store computer program code for causing one or more computing devices of the controller 140 to perform the method of vehicle control described herein. It is to be understood that a controller according to an embodiment of the present invention may be provided by a plurality of computing devices. The functionality described as being performed by the controller may be performed by a plurality of computing devices, control modules or the like, optionally at different physical locations of a vehicle.

Embodiments of the present invention may be understood by reference to the following numbered paragraphs:

1. A controller for a parallel hybrid electric vehicle having a powertrain comprising an engine, electric propulsion motor powered by an energy storage device, and an electric generator operable to be driven by the engine to recharge the energy storage device, the controller being operable to:
   receive one or more signals indicative of one or more operating modes in which the vehicle is to be operated at a given moment in time, the one or more operating modes being selected from a plurality of operating modes;
   receive a signal indicative of demanded powertrain drive torque; and
   cause the engine and electric propulsion motor to deliver drive torque to one or more wheels to drive the vehicle in dependence on the signal indicative of demanded powertrain drive torque,
   the controller being operable to cause the powertrain to operate in a parallel powertrain mode in which when the vehicle is operating with the engine delivering drive torque to the one or more wheels the controller is operable to cause the electric propulsion motor to apply drive torque to the one or more wheels in addition to the engine, the amount of torque delivered by the electric propulsion motor being determined by the controller at least in part in dependence on the signal indicative of demanded powertrain drive torque and the one or more signals indicative of the one or more operating modes in which the vehicle is to be operated.

2. A controller according to paragraph 1 operable to determine the amount of torque that is required to be delivered by the electric propulsion motor in dependence at least in a part on the one or more signals indicative of one or more vehicle operating modes only when a difference exists between the amount of torque delivered by the engine and the amount of demanded powertrain drive torque.

3. A controller according to paragraph 1 wherein the one or more operating modes include one or more transmission operating modes.

4. A controller according to paragraph 1 wherein the one or more operating modes include one or more driving operating modes, wherein in each driving operating mode each of a plurality of selected vehicle sub-systems are caused to operate in a respective one of a plurality of sub-system operating modes.

5. A controller according to paragraph 4 wherein the plurality of selected vehicle sub-systems include at least one selected from amongst a powertrain controller arranged to select a correspondence between accelerator control and powertrain torque in dependence at least in part on the driving operating mode, a suspension control system and a brake control system.

6. A controller according to paragraph 1 further operable to cause the powertrain to operate in an engine charging parallel mode in which the engine drives the generator to recharge the energy storage device or an electric vehicle (EV) mode in which the engine is switched off and the electric propulsion motor is operable to develop drive torque to drive the vehicle.

7. A controller according to paragraph 6 wherein the one or more operating modes include a plurality of hybrid operating modes,
   the controller being operable to receive a signal indicative of a state of charge of the energy storage device and to determine which of the plurality of powertrain modes is appropriate for the vehicle at a given moment, the controller being operable to determine which of the plurality of powertrain modes is appropriate in dependence at least in part on the selected hybrid operating mode, the signal indicative of the instant state of charge of the energy storage device and a reference value of state of charge, the controller being operable to set the reference value of state of charge to one of a plurality of different respective values in dependence on the required hybrid operating mode.
8. A controller according to paragraph 7 operable to determine the appropriate powertrain mode in dependence at least in part on a deviation of the signal indicative of the instant state of charge from the reference value of state of charge.
9. A controller according to paragraph 7 operable to determine which of the powertrain modes is appropriate at a given moment in time according to a value of a cost function for each powertrain mode, the value of the cost function being determined at least in part by reference to the signal indicative of the instant state of charge and the reference value of state of charge of the respective powertrain operating modes.
10. A controller according to paragraph 9 wherein the value of the cost function of each powertrain mode is determined at least in part in further dependence on at least one selected from amongst a rate of fuel consumption of the vehicle in a given powertrain mode, a rate of emission of a gas by the vehicle in a given powertrain mode and an amount of noise generated by the vehicle in a given powertrain mode.
11. A controller according to paragraph 9 configured to determine the required powertrain mode according to a feedback Stackelberg equilibrium control optimisation methodology.
12. A controller according to paragraph 1 operable to determine the amount of additional torque to be delivered by the electric propulsion motor in further dependence on a signal indicative of a position of an accelerator control, the controller being operable to prevent additional drive torque from being delivered in dependence on the signal indicative of accelerator control position.
13. A controller according to paragraph 12 operable to prevent additional drive torque from being delivered unless the accelerator pedal position exceeds a prescribed position.
14. A controller according to paragraph 1 operable to cause the powertrain to operate in a parallel boost mode in which the powertrain causes the electric propulsion motor to apply drive torque to the one or more wheels in addition to the engine in order to meet powertrain torque demand when the powertrain torque demand exceeds the maximum steady state engine output torque.
15. A controller according to paragraph 1 operable to cause the powertrain to operate in a parallel torque filling mode in which the powertrain causes the electric propulsion motor to apply drive torque to the one or more wheels in addition to the engine in order to meet powertrain torque demand more quickly when an amount of powertrain demanded torque is less than the maximum steady state engine torque but exceeds the instant amount of torque developed by the engine.
16. A method of controlling a parallel hybrid electric vehicle having a powertrain comprising an engine, electric propulsion motor powered by energy storage device, and an electric generator operable to be driven by the engine to recharge the energy storage device, the method implemented by a controller and comprising:

receiving one or more signals indicative of one or more operating modes in which the vehicle is to be operated at a given moment in time, the one or more operating modes being selected from a plurality of operating modes;
receiving a signal indicative of demanded powertrain drive torque; and
causing the engine and electric propulsion motor to deliver drive torque to one or more wheels to drive the vehicle in dependence on the signal indicative of demanded powertrain drive torque,
the method comprising causing the powertrain to operate in a parallel powertrain mode in which the engine is caused to deliver drive torque to the one or more wheels and the electric propulsion motor is caused to apply drive torque to the one or more wheels in addition to the engine, the method comprising determining the amount of torque to be delivered by the electric propulsion motor at least in part in dependence on the signal indicative of demanded powertrain drive torque and the one or more signals indicative of the one or more operating modes in which the vehicle is to be operated.
17. A computer readable medium carrying computer program code for controlling a vehicle to carry out the method of paragraph 16.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:
1. A controller for a parallel hybrid electric vehicle having a powertrain comprising an engine, an electric propulsion motor powered by an energy storage device, and an electric generator operable to be driven by the engine to recharge the energy storage device, the controller configured to:
receive one or more signals indicative of one or more operating modes in which the vehicle is to be operated at a given moment in time, the one or more operating modes being selected from a plurality of operating modes including a first operating mode being a user-selectable EV operating mode (SEV operating mode) and a second operating mode being a default hybrid operating mode (HEV operating mode) and wherein the one or more operating modes further include at least one of: one or more transmission operating modes and one or more driving operating modes, wherein in each driving operating mode each of a plurality of selected vehicle sub-systems are caused to operate in a respective one of a plurality of sub-system operating modes;
receive a signal indicative of demanded powertrain drive torque;

cause the engine and electric propulsion motor to deliver drive torque to one or more wheels to drive the vehicle in dependence on the signal indicative of demanded powertrain drive torque;

cause the powertrain to operate in a parallel powertrain mode in which, when the vehicle is operating with the engine delivering drive torque to the one or more wheels;

cause the electric propulsion motor to apply drive torque to the one or more wheels in addition to the engine, the amount of torque delivered by the electric propulsion motor being determined by the controller in dependence on the signal indicative of demanded powertrain drive torque and the one or more signals indicative of the one or more operating modes in which the vehicle is to be operated; and cause the powertrain to operate in a parallel torque filling mode in which the powertrain causes the electric propulsion motor to apply drive torque to the one or more wheels in addition to the engine in order to meet powertrain torque demand more quickly when an amount of powertrain demanded torque is less than the maximum steady state engine torque but exceeds the instant amount of torque developed by the engine, wherein the drive torque applied by the electric propulsion motor when the powertrain is operated in the parallel torque filling mode is restricted when the vehicle is in the SEV operating mode compared to the HEV operating mode.

2. The controller of claim 1, further configured to determine an amount of torque that is required to be delivered by the electric propulsion motor in dependence on the one or more signals indicative of one or more vehicle operating modes only when a difference exists between the amount of torque delivered by the engine and the amount of demanded powertrain drive torque.

3. The controller of claim 1, wherein the plurality of selected vehicle sub-systems include at least one selected from amongst a powertrain controller arranged to select a correspondence between accelerator control and powertrain torque in dependence at least in part on the driving operating mode, a suspension control system and a brake control system.

4. The controller of claim 1, further configured to cause the powertrain to operate in an engine charging parallel mode in which the engine drives the electric generator to recharge the energy storage device or an electric vehicle (EV) mode in which the engine is switched off and the electric propulsion motor is operable to develop drive torque to drive the vehicle.

5. The controller of claim 4, wherein the one or more operating modes include a plurality of hybrid operating modes, and wherein the controller is configured to:
receive a signal indicative of a state of charge of the energy storage device and to determine which of the plurality of powertrain modes is appropriate for the vehicle at a given moment;
determine which of the plurality of powertrain modes is appropriate in dependence on the selected hybrid operating mode, the signal indicative of the instant state of charge of the energy storage device and a reference value of state of charge; and
set the reference value of state of charge to one of a plurality of different respective values in dependence on the required hybrid operating mode.

6. The controller of claim 5, further configured to determine the appropriate powertrain mode in dependence on a deviation of the signal indicative of the instant state of charge from the reference value of state of charge.

7. The controller of claim 5, further configured to determine which of the powertrain modes is appropriate at a given moment in time according to a value of a cost function for each powertrain mode, the value of the cost function being determined by reference to the signal indicative of the instant state of charge and the reference value of state of charge of the respective powertrain operating modes.

8. The controller of claim 7, wherein the value of the cost function of each powertrain mode is determined in further dependence on at least one selected from amongst a rate of fuel consumption of the vehicle in a given powertrain mode, a rate of emission of a gas by the vehicle in a given powertrain mode and an amount of noise generated by the vehicle in a given powertrain mode.

9. The controller of claim 7, further configured to determine the required powertrain mode according to a feedback Stackelberg equilibrium control optimisation methodology.

10. The controller of claim 1, further configured to determine the amount of additional torque to be delivered by the electric propulsion motor in further dependence on a signal indicative of a position of an accelerator control, the controller being operable to prevent additional drive torque from being delivered in dependence on the signal indicative of accelerator control position.

11. The controller of claim 10, further configured to prevent additional drive torque from being delivered unless the accelerator pedal position exceeds a prescribed position.

12. The controller of claim 1, further configured to cause the powertrain to operate in a parallel boost mode in which the powertrain causes the electric propulsion motor to apply drive torque to the one or more wheels in addition to the engine in order to meet powertrain torque demand when the powertrain torque demand exceeds the maximum steady state engine output torque.

13. A method of controlling a parallel hybrid electric vehicle having a powertrain comprising an engine, an electric propulsion motor powered by an energy storage device, and an electric generator configured to be driven by the engine to recharge the energy storage device, the method implemented by a controller and comprising:
receiving one or more signals indicative of one or more operating modes in which the vehicle is to be operated at a given moment in time, the one or more operating modes being selected from a plurality of operating modes including a first operating mode being a user-selectable EV operating mode (SEV operating mode) and a second operating mode being a default hybrid operating mode (HEV operating mode) and wherein the one or more operating modes further include at least one of: one or more transmission operating modes and one or more driving operating modes, wherein in each driving operating mode each of a plurality of selected vehicle sub-systems are caused to operate in a respective one of a plurality of sub-system operating modes;
receiving a signal indicative of demanded powertrain drive torque;
causing the engine and electric propulsion motor to deliver drive torque to one or more wheels to drive the vehicle in dependence on the signal indicative of demanded powertrain drive torque;
causing the powertrain to operate in a parallel powertrain mode in which the engine is caused to deliver drive torque to the one or more wheels and the electric propulsion motor is caused to apply drive torque to the one or more wheels in addition to the engine;

determining the amount of torque to be delivered by the electric propulsion motor at least in part in dependence on the signal indicative of demanded powertrain drive torque and the one or more signals indicative of the one or more operating modes in which the vehicle is to be operated; and causing the powertrain to operate in a parallel torque filling mode in which the powertrain causes the electric propulsion motor to apply drive torque to the one or more wheels in addition to the engine in order to meet powertrain torque demand more quickly when an amount of powertrain demanded torque is less than a maximum steady state engine torque but exceeds an instant amount of torque developed by the engine, and applying drive torque by the electric propulsion motor when the powertrain is operated in the parallel torque filling mode which is restricted when the vehicle is in the SEV operating mode compared to the HEV operating mode.

* * * * *